United States Patent [19]

Tomita et al.

[11] Patent Number: 4,900,770
[45] Date of Patent: Feb. 13, 1990

[54] HOT MELT TYPE SEAL AGENT FOR A LAMP

[75] Inventors: Atsushi Tomita, Nagoya; Hidekatsu Sumi, Gifu, both of Japan

[73] Assignee: Aica Kogyo Co., Ltd., Aichi, Japan

[21] Appl. No.: 221,498

[22] Filed: Jul. 19, 1988

[30] Foreign Application Priority Data

Feb. 25, 1988 [JP] Japan .................................. 63-43232

[51] Int. Cl.4 ........................ C08L 91/06; C08L 93/04
[52] U.S. Cl. .................................... 524/274; 524/275; 524/489
[58] Field of Search ............... 524/489, 505, 275, 277, 524/274

[56] References Cited

U.S. PATENT DOCUMENTS 4,039,364  9/1985  Pollet et al. .......................... 524/505
4,509,821  4/1985  Stenger ................................ 524/489

Primary Examiner—Allan M. Lieberman
Attorney, Agent, or Firm—Finnegan, Henderson, Farabow, Garrett & Dunner

[57] ABSTRACT

The present invention relates to the hot melt type seal agent for adhering and sealing a head lamp of a vehicle, wherein a lens and a housing are integrally one unit. The necessary component materials of the hot melt type seal agent of the present invention include a mixture produced by butyl rubber, SEBS block copolymer and olefin with high softening point. The hot melt type seal agent of the present invention withstands temperature changes in the head lamp and the gas pressure that is filled therein. Consequently, good adhesion, waterproof and high gas-tight performances are achieved.

9 Claims, No Drawings

HOT MELT TYPE SEAL AGENT FOR A LAMP

BACKGROUND OF THE INVENTION

1. Technical Field

This invention relates to a hot melt type seal agent for use as an adhesive seal between a lens and a housing for an incandescent lamp such as a head lump of a vehicle.

2. Prior Art

Formerly, a lamp unit and a housing of a head lump were separate units of an assembly, whereas recently the lamp unit and the housing have become integrally one unit for the purpose of weight reduction of a vehicle and the trend to reduce the complexity of design. In the integral head lamp, a hot melt type seal agent began to be used for adhering and sealing the glass or plastic lens to the plastic or FRP housing. The hot melt type seal agent is produced by kneading a polymer, a tackifier, a softener, a filler and other miscellaneous materials. As the polymer component of the hot melt type seal agent, a simple substance or mixture of such thermoplastic resin or thermoplastic elastomer as ethylene-vinyl acetate copolymer, polyamide resin, polyethylene, ethylene-propylene rubber, styrene-isoprene-styrene (SIS) block copolymer, styrene-butadiene-styrene (SBS) block copolymer, acrylic rubber, polyisobutylene rubber, polyester elastomer and so on and have been generally used. As the softener, a simple substance or mixture of olefin with low molecular weight, atactic polypropylene, polybutene, polyisobutylene with low molecular weight, paraffinic oil, naphthenic oil and straight chain aliphatic acid ester have been used. As the tackifier, a simple substance or mixture of terpene resin, terpene-phenol resin, rosin, hydrogenated-rosin resin, various petroleum resin and so on have been used.

The hot melt type seal agent produced by kneading the above components, however, did not always give satisfactory results in adhesion, weather resistance under severe conditions and physical characteristics at high or low temperature and wet conditions though these results are necessary for the seal agent. For example, internal temperature of a lamp rises as high as 120°–130° C., partially rising around 140° C. when the lamp is lighted. In case of a halogen sealed beam lamp, the seal agent needs a greater sealing performance as it must withstand both the pressure of the sealed gas and a higher temperature than in ordinary incandescent lamps.

SUMMARY OF THE INVENTION

An object of the present invention is to provide a hot melt type seal agent for a lamp which can withstand the above-mentioned severe conditions.

The object is realized by a hot melt type seal agent for a lamp of the present invention which includes butyl rubber, styrene-ethylene-butylene-styrene (SEBS) block copolymer and olefin wax with a softening point higher than 110° C. Here, the weight ratio of (the butyl rubber):(the SEBS block copolymer) is preferably between 90:10 to 40:60. The seal agent may further include filler, coupling agent, antioxidant, colorant and so on in addition to the abovementioned tackifier and softener. The hot melt type seal agent of the present invention is produced by kneading a mixture of the component materials and has a softening point of over 110° C. measured by the ring and ball method according to JIS-K-2531 (ASTM D36).

The butyl rubber as one of the necessary component materials of the present invention is a copolymer of isobutylene and diene-hydrocarbon (mainly isoprene). For example, it may be Butyl Rubber 065 (product of Japan Butyl Rubber Corp., Isoprene Isobutylene Rubber=IIR), AID #10, Chlorobutyl 1066, Polyser-XL-20 or EXXON Butyl 365.

The SEBS polymer may be, for example, Kraton G-1650 (styrene-ethylene-butene-styrene block copolymer), G-1652 or G-1726.

The olefin wax includes olefin with low molecular weight (equivalent molecular weight preferably less than 6,000) whose melt viscosity is low and the softening point is more than 110° C., preferably more than 130° C. measured by the ring and ball method. Oxidized type olefin whose molecule has a few carboxyl groups is more compatible with polar materials than non-oxidized type olefin. The olefin wax may be, for example, A-C316 by Allied Signal Co. with a softening point of 140° C.

In addition to these necessary components, various resins as the above-mentioned tackifier are optionally added and kneaded. In this case, 100 to 150 weight parts of the resins are appropriate to be added per 100 parts of the polymers including the butyl rubber and the SEBS, which leads to good results of wetting and adhesion to the adherent. In addition to the above-mentioned olefin wax, the well-known softener as mentioned above may be included. Fifty (50) to 100 parts of the softener, in this case, are appropriate to be added per 100 parts of the polymer, which leads to good results of wetting of the adherent owing to its low melting temperature and low viscosity. The silane coupling agent is effective as the tackifier characterized by its adhesion to glass, especially a waterproof adhesion. The addition of 0.5 to 5 percent by weight of the silane coupling is appropriate to be added; also pigment may be added as a colorant.

The amount by weight of the butyl rubber plus the SEBS block copolymer in the seal agent is preferably 20 to 50%, that of the olefin wax is preferably 5 to 30%, and that of the other materials is preferably 20 to 75%.

In the present invention, the butyl rubber gives good adhesion, elongation and gas barrier characteristics, while the SEBS gives good elasticity, cohesion and better weather resistance than the SIS and SBS. The oxidized type olefin wax with a high softening point gives high compatibility, adhesion by polar group, heat resistance and anticreep performance by its high softening point. Since the synergistic effect of these three component materials occurs, the softening point is over 110° C. and their heat resistance is high, they are utilized as the hot melt type seal agent for a lamp of a vehicle, especially for a halogen sealed beam lamp which requires heat resistance and a gas barrier resistance.

DETAILED DESCRIPTION OF THE PREFERRED EMBODIMENT

The examples of the hot melt type seal agent of the present invention and comparative examples are produced as in Table 1.

TABLE 1

| COMPOSITION OF TEST MATERIALS (weight parts) | | | | | |
|---|---|---|---|---|---|
| | Examples | | Comparative examples | | |
| | 1 | 2 | 1 | 2 | 3 |
| Butyl rubber 065 | 35 | 12 | 40 | 30 | 10 |
| SEBS (G-1650) | 5 | 18 | 0 | 0 | 20 |

TABLE 1-continued

| COMPOSITION OF TEST MATERIALS (weight parts) | | | | | |
|---|---|---|---|---|---|
| | Examples | | Comparative examples | | |
| | 1 | 2 | 1 | 2 | 3 |
| Wax AC-316 | 20 | 10 | 0 | 0 | 0 |
| Wax APP | 0 | 0 | 20 | 10 | 10 |
| Petroleum resin | 30 | 40 | 30 | 40 | 40 |
| Naphthenic oil | 10 | 20 | 10 | 20 | 20 |
| Silane | 0.5 | 0.5 | 0 | 0 | 0 |

Here,
*Butyl rubber 065: by Japan Butyl Rubber
*G-1650: Kraton G-1650 by Shell Chemical
*Wax AC-316: by Allied Signal Co., softening point = 140° C.
*APP: atactic polypropylene, softening point = 100° C.
*Petroleum resin: Escorez 5300 by EXXON Chemical
*Naphthenic oil: Shellflex 371JY by Shell Chemical
*Silane: Silane coupling agent by Japan Unicor A-1100.

The examples are evaluated according to the following test methods: softening point is measured by the ring and ball method of JIS-K-2531 (ASTM D36); viscosity ($\times 10^2$ poise) at 190° C. is measured by JIS-K-6838 (ASTM D2556-67T); tensile strength and break elongation between glass panes are measured at 20° C., 80° C. and 110° C. by H type method of JIS-A-5758; and the resistance to hot water is evaluated by tensile strength and break elongation by the H type method at 20° C. after the examples are immersed in water of 40° C. for 120 hours. The results are given as shown in Table 2.

TABLE 2

| | | TEST RESULTS | | | |
|---|---|---|---|---|---|
| | | Examples | | Comparative examples | |
| Tests | | 1 | 2 | 1 | 2 | 3 |
| Softening point (°C.) | | 140 | 135 | 100 | 95 | 110 |
| Viscosity ($\times 10^2$P/190° C.) | | 12 | 8 | 20 | 13 | 5 |
| Tensile | 20° C. | 6.0 | 8.0 | 4.0 | 3.0 | 5.0 |
| strength | 80° C. | 1.0 | 1.5 | 0.5 | 0.5 | 0.6 |
| (kgf/cm$^2$) | 110° C. | 0.5 | 0.2 | 0 | 0 | 0 |
| | After immersed | 6.0 | 8.0 | 0 | 0 | 0 |
| Elongation | 20° C. | 10 | 8 | 12 | 10 | 5 |
| (multiple) | 80° C. | 5 | 4.5 | 3 | 2.5 | 1.2 |
| | 110° C. | 3.3 | 4 | — | — | — |
| | After immersed | 10 | 8 | — | — | — |

What is claimed is:

1. A hot melt type seal agent for a lamp comprising butyl rubber, styrene-ethylene-butylene-styrene block copolymer and olefin wax with a softening point higher than 110° C., the seal agent having a softening point higher than 110° C. measured by the ring and ball method, wherein the weight ratio of said butyl rubber to said block copolymer is between 90:10 and 40:60, and the amounts by weight of (1) said butyl rubber plus said block copolymer and (2) said olefin wax are from 20 to 50% and 5 to 30%, respectively, said seal agent further includes 0.5 to 5 weight % of a silane coupling agent.

2. The hot melt type seal agent according to claim 1, wherein the softening point of the olefin wax is higher than 130° C.

3. The hot melt type seal agent according to claim 1, wherein the seal agent further comprises at least one material selected from the group consisting of tackifier, softener, filler, antioxidant, and colorant.

4. The hot melt type seal agent according to claim 3, wherein the seal agent is produced by kneading a mixture of the component materials.

5. The hot melt type seal agent according to claim 4, wherein the amount by weight of the material other than the butyl rubber, the styrene-ethylene-butylene-styrene block copolymer and the olefin wax which is present in the seal agent is from 20 to 75%.

6. The hot melt type seal agent according to claim 3, wherein the tackifier is at least one material selected from the group consisting of terpene resin, terpene-phenol resin, rosin and hydrogenated-rosin.

7. The hot melt type seal agent according to claim 1, wherein the olefin wax is an olefin comprising a carboxyl group with an equivalent molecular weight of less than 6,000.

8. The hot melt type seal agent according to claim 1, wherein the butyl rubber is a copolymer of isobutylene and diene-hydrocarbon.

9. The hot melt type seal agent according to claim 8, wherein the diene-hydrocarbon is isoprene.

* * * * *